Dec. 23, 1924.  
J. F. McCAULEY  
STORAGE BATTERY  
Filed June 3, 1922  
1,520,587
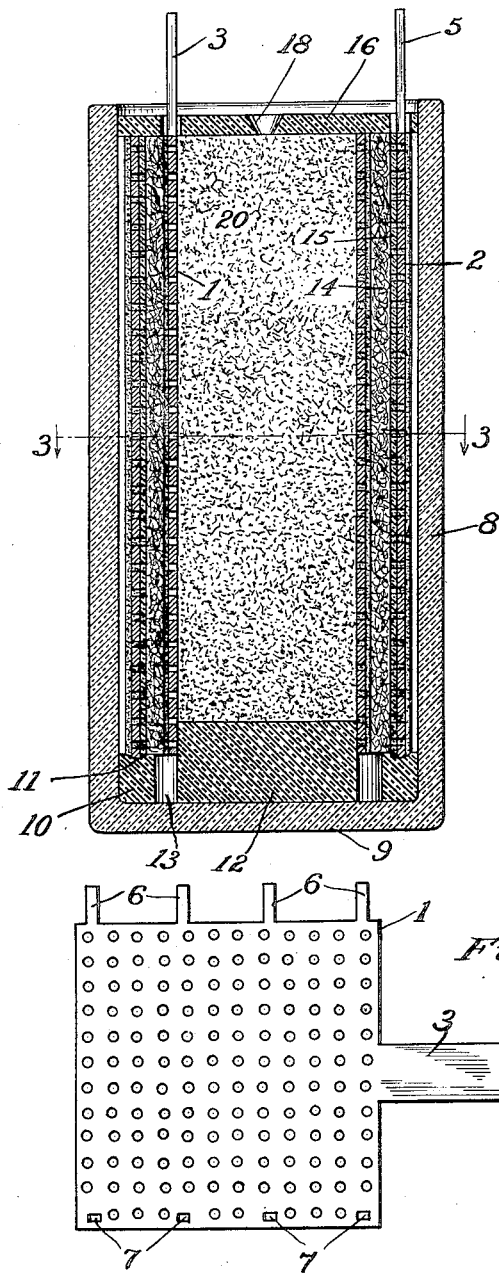
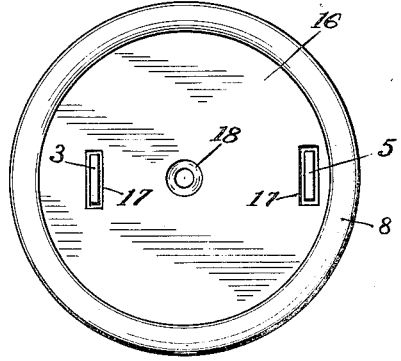
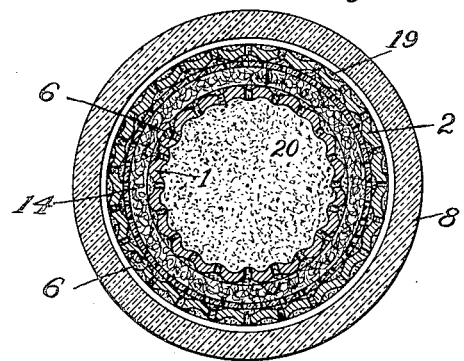
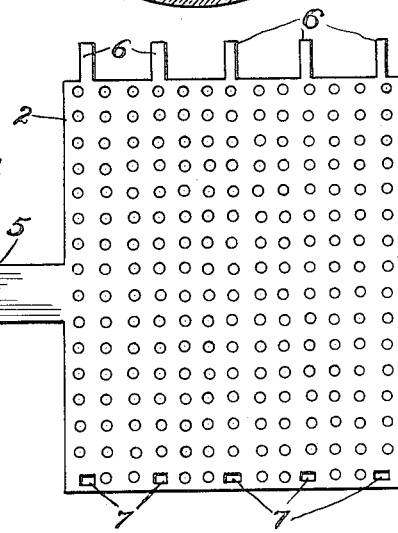
WITNESSES  
F.R. Walker  
S.W. Foster
INVENTOR  
Jas. F. McCauley  
BY Munn & Co.  
ATTORNEYS Patented Dec. 23, 1924.

1,520,587

UNITED STATES PATENT OFFICE.

JAMES F. McCAULEY, OF CLEVELAND, OHIO.

STORAGE BATTERY.

Application filed June 3, 1922. Serial No. 565,505.

*To all whom it may concern:*

Be it known that I, JAMES F. MCCAULEY, a citizen of the United States, and a resident of Cleveland, in the county of Cuyahoga and State of Ohio, have invented a new and Improved Storage Battery, of which the following is a full, clear, and exact description.

This invention relates to improvements in storage batteries, an object of the invention being to provide a storage battery unit or cell, in which the positive and the negative electrodes are of general cylindrical form, concentrically arranged and having fluted, corrugated, or serrated formation, whereby a maximum of surface is had.

A further object is to provide the positive and negative electrodes of improved construction which can be manufactured and sold at a reasonably low price, which can be readily assembled or formed into operative position, and which will give the maximum of electricity storage capacity.

A further object is to provide a storage battery cell, or unit, which is small and compact, which readily lends itself for use in connection with radio apparatus and which is capable of a wide range of utility in connection or combination, with any number of cells of given necessary current or storage capacity.

With these and other objects in view, the invention consists in certain novel features of construction and combinations, and arrangement of parts, as will be more fully hereinafter described and pointed out in the claim.

In the accompanying drawings—

Figure 1 is a view in longitudinal section illustrating my improved storage battery unit or cell.

Figure 2 is a top plan view of Figure 1.

Figure 3 is a view in transverse section on the line 3—3, of Figure 1.

Figure 4 illustrates a blank from which the positive and negative electrodes as well as the terminals thereof can be formed.

1 represents the positive electrode, and 2 the negative electrode of my improved battery cell. These parts 1 and 2 are both preferably of sheet lead and may be formed from a single blank as shown in Figure 4 and connected by an integral strip 4 which, when severed, will form the terminals 3 and 5 of the respective positive and negative electrodes.

The sheets forming the positive and negative electrodes are bent into cylindrical form and integral tongues 6 on one side of the plates, are projected through slots 7 in the other sides, or edges, of the plates and bent to securely clamp the plates in cylindrical form. These parts are also fluted, corrugated, or serrated, preferably longitudinally so as to give a maximum of surface thereto as indicated most clearly in Figure 3.

8 represents a jar, or casing, preferably of glass, porcelain or other insulating material of general cylindrical form having a closed bottom 9 and an open top.

A ring 10 is located in the bottom of the jar 8 and has a grooved upper face 11 receiving the lower end of the negative electrode 2. A plug 12 of insulating material snugly fits within the lower end of the positive electrode 1 and supports the latter above the bottom 9 leaving a mud, or sediment space at the bottom as shown at 13. A spacer 14 bent into general cylindrical form is located between the positive and negative electrodes. This spacer 14 may be of wood or any other suitable porous material and is preferably in the form of a sheet bent into cylindrical form and positioned between the positive and negative electrodes as shown. A perforated sleeve 15, preferably of rubber or any other insulating material incloses the spacer 14 and holds the same in cylindrical formation and prevents spreading or gapping of the joint.

The negative electrode 2 is covered on both sides and through the perforations thereof with a suitable paste 19, formed by a liquid of suitable ingredient. The positive electrode 1 is filled with a suitable material 20, which extends to the outer surface thereof or forms a paste, filling the hollows or serrations, in the outer surface of the positive.

The terminals 3 and 5 project above the jar 8 and a cover 16, preferably of disc like form and of nonconducting material fits within the upper end of the jar 8, is provided with openings 17 to receive the terminals 3 and 5, and is formed centrally with a conical inlet opening 18 through which acid, or other fluid may be poured into the cell.

It will be noted that the ring 10 serves also to support the lower end of the spacer 14 so that all the parts are maintained above the bottom of the jar as clearly shown in Figure 1.

While I have specified certain materials it is obvious that the invention is not limited to the particular materials employed, and I do not wish to limit myself thereto, but desire to cover broadly the structural formation and arrangement of the cell.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

I claim:

A storage battery, comprising a jar having an open top, a ring in the bottom of the jar, a negative electrode supported on the ring, a positive electrode within the negative electrode, a plug in the positive electrode supporting the latter above the bottom of the jar, a porous spacer between the electrodes, a perforated sleeve around the spacer, said positive and negative electrodes having perforations therein, and chemical substances in said battery and coating the surfaces of the positive and the negative electrodes.

JAMES F. McCAULEY.